US011372797B2

(12) United States Patent
Chen

(10) Patent No.: US 11,372,797 B2
(45) Date of Patent: Jun. 28, 2022

(54) DOCK SYSTEM AND SETTING METHOD FOR DOCK

(71) Applicant: Wistron Corp., New Taipei (TW)

(72) Inventor: Yung-Feng Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 16/868,425

(22) Filed: May 6, 2020

(65) Prior Publication Data

US 2021/0240654 A1 Aug. 5, 2021

(30) Foreign Application Priority Data

Feb. 3, 2020 (TW) ................................ 109103141

(51) Int. Cl.

| | |
|---|---|
| ***G06F 13/00*** | (2006.01) |
| ***G06F 13/40*** | (2006.01) |
| ***G06F 13/42*** | (2006.01) |
| ***G06F 1/28*** | (2006.01) |
| ***G06F 1/26*** | (2006.01) |

(52) U.S. Cl.

CPC .......... *G06F 13/4081* (2013.01); *G06F 1/266* (2013.01); *G06F 1/28* (2013.01); *G06F 13/4282* (2013.01); *G06F 2213/0042* (2013.01)

(58) Field of Classification Search

CPC .................................................. G06F 13/4081

See application file for complete search history.

(56) References Cited

U.S. PATENT DOCUMENTS

| | | | | |
|---|---|---|---|---|
| 2002/0083228 | A1* | 6/2002 | Chiloyan | H04L 29/06 710/9 |
| 2003/0177271 | A1* | 9/2003 | Park | H04L 29/12113 709/246 |
| 2005/0015536 | A1* | 1/2005 | Lee | G06F 9/4415 710/313 |
| 2007/0129013 | A1* | 6/2007 | Mehta | H04W 28/18 455/41.2 |
| 2012/0225668 | A1* | 9/2012 | Lee | H04N 21/25841 455/456.1 |
| 2013/0151749 | A1* | 6/2013 | Lai | G06F 13/426 710/313 |
| 2013/0179618 | A1* | 7/2013 | Casas, Jr. | G06F 13/385 710/303 |
| 2018/0143927 | A1* | 5/2018 | Kim | G06F 13/385 |

FOREIGN PATENT DOCUMENTS

| | | |
|---|---|---|
| TW | 201348921 A | 12/2013 |
| TW | 201913402 A | 4/2019 |

* cited by examiner

*Primary Examiner* — Henry Tsai
*Assistant Examiner* — Dean Phan

(57) ABSTRACT

A dock system is provided. The dock system includes a dock device and an electronic device. The dock device includes a first connection interface, a Power Delivery (PD) controller, a storage device, and a plurality of connection ports. The PD controller is coupled to the connection ports. The electronic device includes a second connection interface and a processor. In response to the first connection interface being connected to the second connection interface, the processor executes a high-layer service filter driver to write system information corresponding to the electronic device into the storage device, and the PD controller uses the system information to set the parameters of the connection ports. The first connection interface and the second connection interface are PD interfaces.

14 Claims, 3 Drawing Sheets

DOCK SYSTEM AND SETTING METHOD FOR DOCK

CROSS REFERENCE TO RELATED APPLICATIONS

This Application claims priority of TW Patent Application No. 109103141 filed on Feb. 3, 2020, the entirety of which is incorporated by reference herein.

BACKGROUND OF THE INVENTION

Field of the Invention

The invention generally relates to dock system technology, and more particularly, to dock system technology in which a high-layer service filter driver is established in the operation system of an electronic device in the dock system to enable the dock device of the dock system to identify different brands of electronic devices.

Description of the Related Art

With the development of Universal Serial Bus (USB) Power Delivery (PD), a dock device can be configured to provide power. In addition, the dock device can be configured to work with different connection ports, e.g. a USB connection port, a display (DP) port, a high-definition multimedia interface (HDMI) connection port.

However, in a traditional dock device, when the electronic device connected to the upstream port of the dock device is a different brand than the dock device, then the latter cannot communicate directly with the electronic device through a vender defined message (VDM). Therefore, when an electronic device of a different brand than the dock device requires specific settings, the dock device is not able to directly adjust the settings of the parameters that correspond to the connection port of the dock device.

BRIEF SUMMARY OF THE INVENTION

The invention provides dock systems and setting methods for the dock device to overcome the problems described above.

An embodiment of the invention provides a dock system. The dock system includes a dock device and an electronic device. The dock device includes a first connection interface, a Power Delivery (PD) controller, a storage device and a plurality of connection ports. The PD controller is coupled to the connection ports. The electronic device includes a second connection interface and a processor. In response to the first connection interface being connected to the second connection interface, the processor performs a high-layer service filter driver to write the system information of the electronic device into the storage device, and the PD controller uses the system information to set the parameters of the connection ports. The first connection interface and the second connection interface are PD interfaces.

In one embodiment of the present invention, the electronic device includes a button. In response to the button being pressed, the processor performs the high-layer service filter driver to write the system information of the electronic device into the storage device.

In one embodiment of the present invention, the PD controller polls the storage device within a time interval as to whether the system information has been written into the storage device.

In one embodiment of the present invention, if during the time interval, the system information has not been written into the storage device, the PD controller of the dock device adopts default values for the parameters corresponding to the connection ports of the dock device, and if during the time interval, the system information has been written into the storage device, the PD controller of the dock device uses the system information to set the parameters of the connection ports.

In one embodiment of the present invention, the storage device is configured in a USB hub controller of the dock device, wherein the PD controller is coupled to the USB hub controller. In one embodiment of the present invention, the storage device is configured in the PD controller.

In one embodiment of the present invention, the system information includes the System Identity (S_ID) and the Vender Identity (V_ID).

An embodiment of the invention provides a setting method for the dock device. The setting method for the dock device is applied to a dock system, wherein the dock system includes a dock device and an electronic device. The setting method for the dock device includes the steps of in response to the first connection interface of the dock device being connected to the second connection interface of the electronic device, the processor of the electronic device performs the high-layer service filter driver to the write system information of the electronic device into the storage device, wherein the first connection interface and the second connection interface are Power Delivery (PD) interfaces; and the PD controller of the dock device uses the system information to set the parameters of the connection ports.

Other aspects and features of the invention will become apparent to those with ordinary skill in the art upon review of the following descriptions of specific embodiments of the dock system and setting method for the dock device.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

Figure 1A:
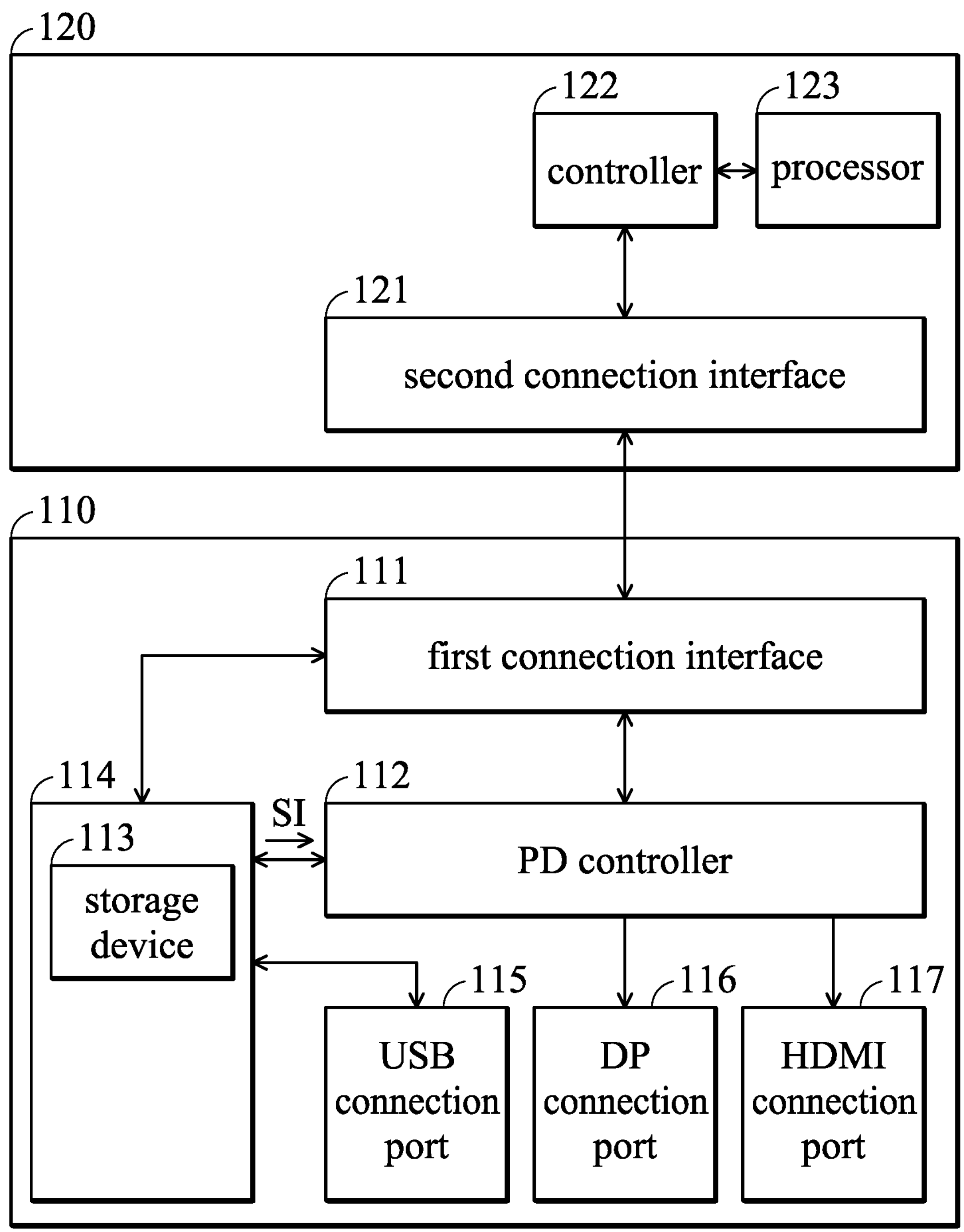
FIG. 1A is a block diagram of a dock system 100 according to an embodiment of the invention.

FIG. 1A is a block diagram of a dock system 100 according to an embodiment of the invention. As shown in FIG. 1A, dock system 100 may include a dock device 110 and an electronic device 120. It should be noted that in order to clarify the concept of the invention, FIG. 1A presents a simplified block diagram in which only the elements relevant to the invention are shown. However, the invention should not be limited to what is shown in FIG. 1A.

In addition, it should be noted that in an embodiment of the present invention, the dock device 110 and the electronic device 120 may be either the same brand or different brands. That is to say, An embodiment of the present invention, the dock device 110 of dock system 100 can be applied to the electronic device 120 with the same brand as dock device 110 or can be applied to an electronic device 120 of a different brand than dock device 110. When the dock device 110 and the electronic device 120 are the same brand, the dock device 110 can directly communicate with the electronic device 120 through the vendor defined Message (VDM) to set the settings of the parameters corresponding to the connection ports of the dock device 110. The embodiments of the invention as detailed below are mainly for situations in which the dock device 110 and the electronic device 120 are different brands.

As shown in FIG. 1A, the dock device 110 includes a connection interface 111, power deliver (PD) controller 112, a storage device 113, universal serial bus hub (USB hub) controller 114 at least one USB connection ports 115, a display (DP) connection port 116 and a high definition multimedia interface (HDMI) connection port 117. It should be noted that the block diagram of the dock device 110 shown in FIG. 1A is only used to illustrate the embodiments of the invention, but the invention should not be limited thereto. The dock device 110 also includes other elements and other connection ports, e.g. security digital (SD) card connection port, micro-SD card connection port, Ethernet connection port and the audio connection port but the invention should not be limited thereto.

In the embodiment of the invention, the first connection port 111 may be a USB PD interface, e.g. a USB Type-C PD interface, but the invention should not be limited thereto. In the other embodiments of the invention, the first connection port 111 may also be other USB PD interface, e.g. a Thunderbolt (TBT) or a USB 4 interface, but the invention should be limited thereto. The PD controller 112 may be coupled to the configuration channel (CC) pin of the first connection port 111. The USB hub controller 114 may be coupled to the USB data transmission pin (e.g. Tx pin or Rx pin) of the first connection port 111. In an embodiment of the present invention, the first connection port 111 may be regarded as an upstream port of the dock device 110 and the USB connection port 115, DP connection port 116 and the HDMI connection port 117 may be regarded as a downstream port of the dock device 110.

In an embodiment of the present invention, the storage device 113 may be a serial peripheral interface (SPI) read-only memory (ROM), but the invention should not be limited thereto. In the embodiments of the FIG. 1A, the storage device 113 is configured in the USB hub controller 114, but the invention should not be limited thereto.

In an embodiment of the present invention, the USB connection port 115 includes a plurality of USB connection ports with different standards. For example, the USB connection port 115 includes Type-C connection port, USB 3.1 connection port, and USB 2.0 connection port, but the invention should not be limited thereto.

Back to FIG. 1A, as shown in FIG. 1A, the electronic device 120 includes a second connection interface 121, a controller 122 and a processor 123. In an embodiment of the present invention, the electronic device 120 may be a notebook or desk computer, but the invention should not be limited thereto. It should be noted that, the block diagram of the electronic device 120 shown in FIG. 1A is only used to illustrate the embodiments of the invention, but the invention should not be limited thereto. The electronic device 120 also includes other elements.

According to an embodiment of the invention, the second connection interface 121 may be a USB PD interface, e.g. a USB Type-C PD interface, but the invention should not be limited thereto. In the other embodiments of the invention, the second connection interface 121 may also be other PD interfaces, e.g. a Thunderbolt (TBT) or a USB 4 interface, but the invention should be limited thereto. In addition, the controller 122 may be a DP controller or an embedded controller (EC). The controller 122 may be coupled to the configuration channel (CC) pin of the second connection interface 121.

According to an embodiment of the invention, a high-layer service filter driver is established in the operating system (OS) of the electronic device 120. When the processor 123 performs the high-layer service filter driver, the electronic device 120 may write the system information SI into the storage device 113 of the dock device 110. Details will be illustrated in the below embodiments. According to an embodiment of the invention, the high-layer service filter driver may be a Service, a Driver or a Filter Driver. The Service may be an application programming interface (API). According to an embodiment of the invention, the system information SI includes the System Identity (S_ID) and the Vender Identity (V_ID) of the electronic device 120.

According to an embodiment of the invention, when the first connection interface 111 of the dock device 110 is connected to the second connection interface 121 of the electronic device 120, the processor 123 may perform the high-layer service filter driver to receive the system information SI corresponding to the electronic device 120. Then, the processor 123 may transmit the system information SI corresponding to the electronic device 12 to the first connection interface 111 of the dock device 110 through the second connection interface 121 to write the system information SI into the storage device 113 of the dock device 110.

In addition, when the first connection interface 111 of the dock device 110 is connected to the second connection interface 121 of the electronic device 120, the PD controller 112 may poll the USB hub controller 114 to ask whether there is system information SI (e.g. S_ID and V_ID) of the electronic device 120 in the storage device 113. After the PD controller 112 receives the system information SI of the electronic device 120, the PD controller 120 may set the settings of the parameters correspond to the connection ports (e.g. the USB connection port 115, DP connection port 116 and the HDMI connection port 117, but the invention should not be limited thereto) of the dock devices 110 according to the system information SI of the electronic device 120. For example, the PD controller 112 may set the equalizer (EQ) value of the USB connection port 115 according to the system information SI of the electronic device 120. The PD controller 112 may set the power value of each connection port according to the system information SI of the electronic device 120. It should be noted that the invention should not be limited to these examples.

According to an embodiment of the invention, the electronic device 120 may further include a button (not illustrated in figures). The button may be configured on an operation interface of the electronic device 120. In the embodiment, in the condition that the PD controller 112 does not receive the system information SI of the electronic device 120 from the storage device 113 (i.e., the system information SI of the electronic device 120 has not been written into the storage device 113), the user can press the button. In response to the button is pressed, the processor 123 is triggered to re-execute the high-layer service filter driver of the operating system, in order to write the system information SI into storage device 113 of the dock device 110. In addition, in response to the button is pressed, the operating system of the electronic device 120 is triggered to re-poll the dock device 110, to instruct the PD controller 112 of the dock device 110 to re-poll the storage device 113 of the USB hub controller 114 to determine whether there is system information SI (e.g., S_ID and V_ID) transmitted from the electronic device 120. Then, in response to the PD controller 112 receives the system information SI of the electronic device 120 (i.e., the system information SI of the electronic device 120 has been written into the storage device 113), the PD controller 112 sets the settings of the connection ports of the dock device 110 in accordance with the system information SI. In the condition that the PD controller 112 does not receive the system information SI of the electronic device 120 (i.e. the system information SI of the electronic device 120 still has not been written into the storage device 113), the PD controller 112 sets the settings of the connection ports of the dock device 110 in default values. In another embodiment, in the condition that the PD controller 112 still does not receive the system information SI of the electronic device 120 (i.e., the system information SI of the electronic device 120 still has not been written into the storage device 113), the user can press the button again.

According to another embodiment of the invention, the PD controller 112 may poll the USB hub controller 114 to determine whether there is system information SI (e.g. S_ID and V_ID) of the electronic device 120 during a default time interval (e.g. 20 seconds). If during the time interval, the PD controller 112 receives the system information SI of the electronic device 120 (i.e. the system information SI of the electronic device 120 has been written into the storage device 113), the PD controller 112 sets the settings of the connection ports of the dock device 110 according to the system information SI. If during the time interval, the PD controller 112 does not receive the system information SI of the electronic device 120 from the storage device 113 (i.e. the system information SI of the electronic device 120 still has not been written into the storage device 113), the PD controller 112 adopts the default values of the parameters corresponding to the connection ports of the dock device 110 to set the settings thereof. In an embodiment of the present invention, the default values of the parameters may be the default values defined in the USB PD standard.

Figure 1B:
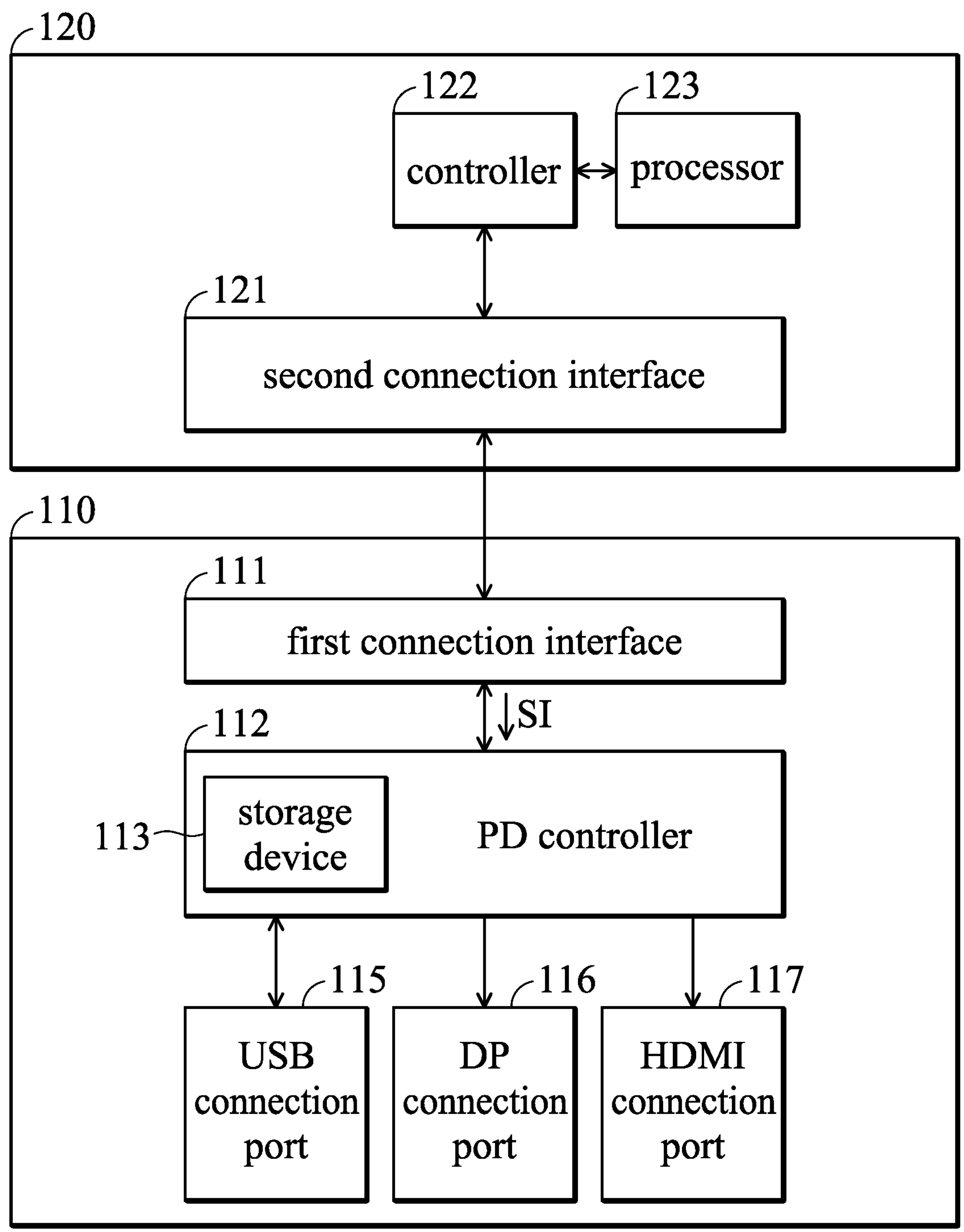
FIG. 1B is a block diagram of a dock system 100 according to another embodiment of the invention.

FIG. 1B is a block diagram of a dock system 100 according to another embodiment of the invention. It should be noted that in order to clarify the concept of the invention, FIG. 1B presents a simplified block diagram in which only the elements relevant to the invention are shown. However, the invention should not be limited to what is shown in FIG. 1B.

Comparing the dock system 100 of FIG. 1B to the dock system 100 of FIG. 1A, the difference is that in the dock system 100 of FIG. 1B, the storage device 113 is configured in the PD controller 112 and the dock device 110 does not include the USB hub controller 114. Therefore, in the embodiment, when the first connection interface 111 of the dock device 110 is connected to the second connection interface 121 of the electronic device 120, the processor 123 may perform the high-layer service filter driver of the operating system to receive the system information SI corresponding to the electronic device 120, and transmits the system information SI corresponding to the electronic device 120 to the first connection interface 111 of the dock device 110 through the second connection interface 121, to write the system information SI into the storage device 113 of the PD controller 112. The PD controller 112 may directly poll the storage device 113 to determine whether there is system information SI (e.g., S_ID and V_ID) transmitted from the electronic device 120. It should be noted that the dock system 100 of FIG. B also includes the USB hub controller 114, but the system information SI is written into the storage device 113 of the PD controller 112.

Other operations of the dock system in FIG. 1B are the same as the dock system of FIG. 1A. Therefore, the details are not illustrated again.

According to another embodiment of the invention, unlike the method of establishing a high-layer service filter driver in the operating system described above, the dock device 110 recognizes whether the brand of an electronic device 120 is different from the dock device 110 or not, by directly changing the settings of the Inbox Driver of the operation system.

Figure 2:
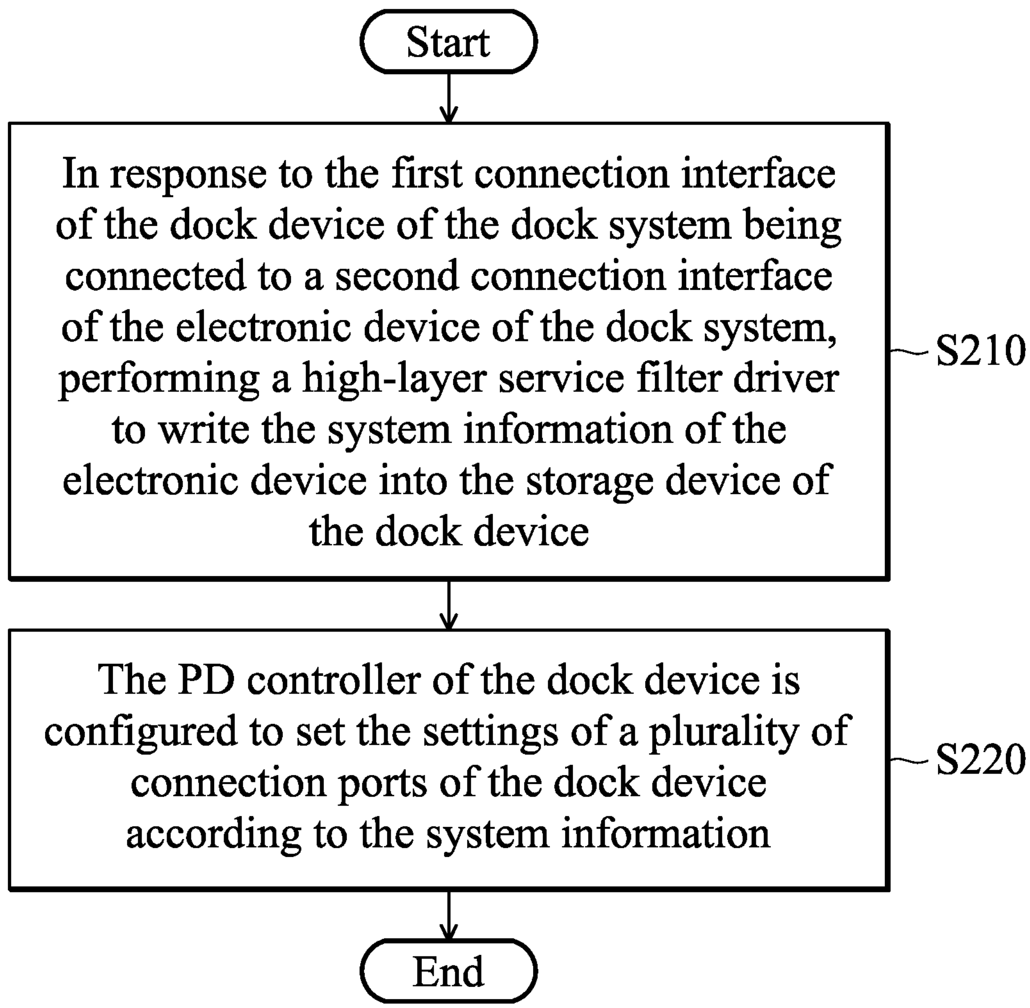
FIG. 2 is a flow chart 200 illustrating a setting method for the dock device according to an embodiment of the invention.

FIG. 2 is a flow chart 200 illustrating a setting method for the dock device according to an embodiment of the invention. The setting method for the dock device can be applied to the dock system 100. As shown in FIG. 2, in step S210, in response to the first connection interface of the dock device of the dock system 100 being connected to a second connection interface of the electronic device of the dock system 100, the processor of the electronic device performs a high-layer service filter driver to write the system information that corresponds to the electronic device into the storage device of the dock device, wherein the first connection interface and the second connection interface are PD interfaces. In step S220, the PD controller of the dock device is configured to set the settings of a plurality of connection ports of the dock device according to the system information.

According to some embodiments of the invention, the setting method for the dock device further includes the step of performing the high-layer service filter driver to write the system information of the electronic device into the storage device of the dock device by pressing a button on the electronic device of the dock system 100.

According to some embodiments of the invention, the setting method for the dock device further includes the step of during a time interval, the PD controller of the dock device of the dock system 100 may poll the storage device to determine whether the system information has been written into the storage device. During the time interval, in response to the system information has not been written into the storage device, the PD controller of the dock device adopts default values for the parameters corresponding to the connection ports of the dock device. During the time interval, in response to the system information has been written into the storage device, the PD controller of the dock device sets the parameters corresponding to the connection ports of the dock device according to the system information.

According to the setting method for the dock device provided in an embodiment of the present invention, a high-layer service filter driver is established in the operating system of the electronic device of the dock system. When the dock device and the electronic device of the dock system are different brands, the dock device sets the settings corresponding to each of the connection ports of the dock device, according to the system information that is written into the storage device of the dock device when the high-layer service filter driver is performed. Therefore, according to the setting method for the dock device provided in an embodiment of the present invention, the dock device of the dock system will have the ability to recognize different brands of electronic devices, and set the settings for each connection port of the dock device to the different requirements of the different brands of electronic devices.

Use of ordinal terms such as “first”, “second”, “third”, etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a “processor”) such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may include a computer-readable medium comprising codes relating to one or more of the aspects of the disclosure. In some aspects a computer program product may include packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A dock system, comprising:

a dock device, comprising a first connection interface, a Power Delivery (PD) controller, a storage device and a plurality of connection ports with different types, wherein the PD controller is coupled to the first connection interface and the plurality of connection ports; and an electronic device, comprising a second connection interface and a processor;

wherein in response to the first connection interface being connected to the second connection interface, the processor executes a high-layer service filter driver to write system information of the electronic device into the storage device, and the PD controller of the dock device sets parameters corresponding to each of the plurality of connection ports according to the system information of the electronic device;

wherein the first connection interface and the second connection interface are PD interfaces.

2. The dock system of claim 1, wherein the electronic device comprises a button, wherein in response to the button being pressed, the processor executes the high-layer service filter driver to write the system information corresponding to the electronic device into the storage device.

3. The dock system of claim 1, wherein within a time interval, the PD controller polls the storage device as to whether the system information has been written into the storage device.

4. The dock system of claim 3, wherein in response to, during the time interval, the system information has not been written into the storage device, the PD controller of the dock device adopts default values for parameters corresponding to the connection ports of the dock device, and in response to, during the time interval, the system information has been written into the storage device, the PD controller of the dock device sets the parameters corresponding to the connection ports of the dock device according to the system information.

5. The dock system of claim 1, wherein the storage device is configured in a USB hub controller of the dock device, wherein the PD controller is coupled to the USB hub controller.

6. The dock system of claim 1, wherein the storage device is configured in the PD controller.

7. The dock system of claim 1, wherein the system information comprises the System Identity (S_ID) and the Vender Identity (V_ID).

8. A setting method for the dock device, applied to a dock system, wherein the dock system comprises a dock device and an electronic device, comprising:

in response to a first connection interface of the dock device being connected to a second connection interface of the electronic device, executing, by a processor of the electronic device, a high-layer service filter driver to write system information of the electronic device into a storage device, wherein the first connection interface and the second connection interface are Power Delivery (PD) interfaces; and setting, by a PD controller of the dock device, parameters corresponding to each of a plurality of connection ports with different types of the dock device according to the system information of the electronic device.

9. The setting method for the dock device of claim 8, wherein the step of executing the high-layer service filter driver to write the system information corresponding to the electronic device into a storage device further comprises:

in response to a button on the electronic device being pressed, executing the high-layer service filter driver to write the system information corresponding to the electronic device into the storage device.

10. The setting method for the dock device of claim 8, wherein the step of executing the high-layer service filter driver to write the system information corresponding to the electronic device into a storage device further comprises:

within a time interval, polling, by the PD controller, the storage device as to whether the system information has been written into the storage device.

11. The setting method for the dock device of claim 10, wherein the step of within the time interval, polling the storage device as to whether the system information has been written into the storage device further comprises:

in response to, during the time interval, the system information has not been written into the storage device, adopting, by the PD controller, default values for the parameters corresponding to the connection ports of the dock device; and in response to, during the time interval, the system information has been written into the storage device, setting, by the PD controller, the parameters corresponding to the connection ports of the dock device according to the system information.

12. The setting method for the dock device of claim 8, wherein the storage device is configured in a USB hub controller of the dock device.

13. The setting method for the dock device of claim 8, wherein the storage device is configured in the PD controller.

14. The setting method for the dock device of claim 8, wherein the system information comprises the System Identity (S_ID) and the Vender Identity (V_ID).

* * * * *